United States Patent [19]
Powers et al.

[11] 3,847,724
[45] Nov. 12, 1974

[54] NON-BLOCKING FOAMED POLYMERIC LAMINATE AND METHOD

[75] Inventors: Thomas J. Powers, Shelton J. Jones, both of Monroe, La.

[73] Assignee: Olinkraft, Inc., West Monroe, La.

[22] Filed: Feb. 20, 1974

[21] Appl. No.: 443,951

Related U.S. Application Data

[63] Continuation-in-part of Ser. No. 253,051, May 15, 1972, abandoned.

[52] U.S. Cl. ............... 161/161, 161/164, 161/165, 161/167, 161/190, 161/218, 161/220, 156/60
[51] Int. Cl. ............................................. B32b 3/26
[58] Field of Search .......... 161/161, 165, 190, 164, 161/167, 216, 218, 220; 156/60

[56] References Cited
UNITED STATES PATENTS

| | | | |
|---|---|---|---|
| 2,875,117 | 2/1959 | Potchen et al. | 161/161 |
| 3,160,549 | 12/1964 | Caldwell et al. | 161/161 |
| 3,197,352 | 7/1965 | Coates | 161/161 |
| 3,540,977 | 11/1970 | Schickedanz | 161/161 |
| 3,640,832 | 2/1972 | Kurz | 161/161 |

*Primary Examiner*—William J. Van Balen
*Attorney, Agent, or Firm*—Norvell E. Von Behren

[57] ABSTRACT

A fire resistant, non-blocking low density laminated structure comprising a polymeric foam core which is sandwiched between two layers of coated paper. The paper is coated on both sides with aluminum foil with one of the outermost layers of aluminum foil being primed with a coating dissimilar from the coating on the outermost layer of aluminum foil so that whenever the laminated structure is stacked on top of another similarly laminated structure the dissimilar outer coatings on the laminate will prevent the laminate from adhering to each other. In the preferred embodiment the dissimilar outermost coatings may comprise a vinyl chloride/vinyl acetate coating on one side of the structure with a nitrocellulose coating contained on the other side of the structure. The selected dissimilar coatings give the desired non-blocking characteristics as well as providing improved scuff resistance to the structure which allows similar structures to be stacked on top of each other without sticking together and so as not to allow discoloration of the white surface due to scuffing against an otherwise raw aluminum surface. The outermost coatings may also be pigmented for purposes of enhancing the appearance of the structure.

Also disclosed is a new and novel method of stacking the foamed laminate so that the laminate will not adhere to similar laminate stacked on top of each other.

11 Claims, 3 Drawing Figures

NON-BLOCKING FOAMED POLYMERIC LAMINATE AND METHOD

CROSS REFERENCES TO RELATED APPLICATIONS

This is a continuation-in-part of Ser. No. 253,051, filed 5/15/72 and now abandoned.

BACKGROUND OF THE INVENTION

This invention relates generally to coatings and more particularly to a non-blocking foamed polymeric laminate structure and method of stacking the structure for shipment. The structures have dissimilar outer coatings which allow the structure to be stacked on top of a similar structure in a controlled manner without the respective structures adhering to each other.

It is known in the prior art to form laminates of foamed polymeric material with outer coatings of similar layers of material. One such laminate is disclosed in the U.S. Pat. No. 3,496,058, issued Feb. 17, 1970 to R. C. Schroter et al wherein a inner foamed layer 16 is coated with outer metallic sheeting layers 14 and 17 of a similar material with other intermediate layers also being provided in the laminate. A similar type laminate is disclosed in the U.S. Pat. No. 3,499,819, issued Mar. 10, 1970 to John R. Lewis wherein the outer layers of the laminate are formed from aluminum with the inner surfaces of the aluminum being treated for better bonding to the polypropylene foam core.

A modification of this general type foamed panel structure is disclosed in the U.S. Pat. No. 3,197,352, issued July 27, 1965 to J. M. Coates wherein the outer coatings of the foamed core comprise generally a polyester or an epoxy resin for the purposes disclosed in the patent. While this type coating and the other beforementioned coatings that have been applied to the foamed core may have been satisfactory for the purposes intended, it has been found that problems are encountered when the outer coatings are formed of the same or similar type of materials. These problems result from the respective panels sticking together or adhering to each other partially whenever they are stacked on top of each other after they are manufactured or when they are stored in the purchaser's warehouse awaiting shipment to the ultimate consumer.

It has also been found to be advantageous when constructing a foamed laminate structure to provide the structure with fire resisting qualities which will enable it to be utilized in the many applications where fire resistance is desirable or required by law.

SUMMARY OF THE INVENTION

In order to overcome the problems inherent in the prior art devices there has been provided by the subject invention a new and novel non-blocking or non-adhering foamed polymeric laminate structure which has improved fire resistant qualities and which may be formed by the method taught and may be stacked on top of a similar structure in a controlled manner without the respective structures adhering to each other thereby preserving the integrity of the outer coating. The non-blocking characteristics of the structure are provided by coating the outermost sides of the laminate with dissimilar coatings which have the necessary scuff resistant qualities and which do not stick together when the coated side is placed against a dissimilar coated side. The improved fire resistant qualities are obtained by coating a paper layer on both sides with a layer of aluminum foil with this structure being applied to both sides of the polymeric foam core.

Accordingly it is an object of the invention to provide a new and novel laminated structure which has improved fire resistant qualities and which is coated on the outermost sides thereof with dissimilar coatings which act to prevent the laminated structure from adhering to a similarly laminated structure whenever the structures are stacked on top of each other with the dissimilar coatings being in juxtaposition.

A further object of the invention is to provide a new and novel polymeric foam laminated structure which may be manufactured economically and may be utilized as an interior wall with the structure being capable of having its outer sides pigmented without destroying the non-blocking characteristics of the panel.

These objects and other advantages of the invention will become apparent from a review of the drawings and from a reading of the description of the preferred embodiment.

DESCRIPTION OF THE PREFERRED EMBODIMENT

Figure 1:
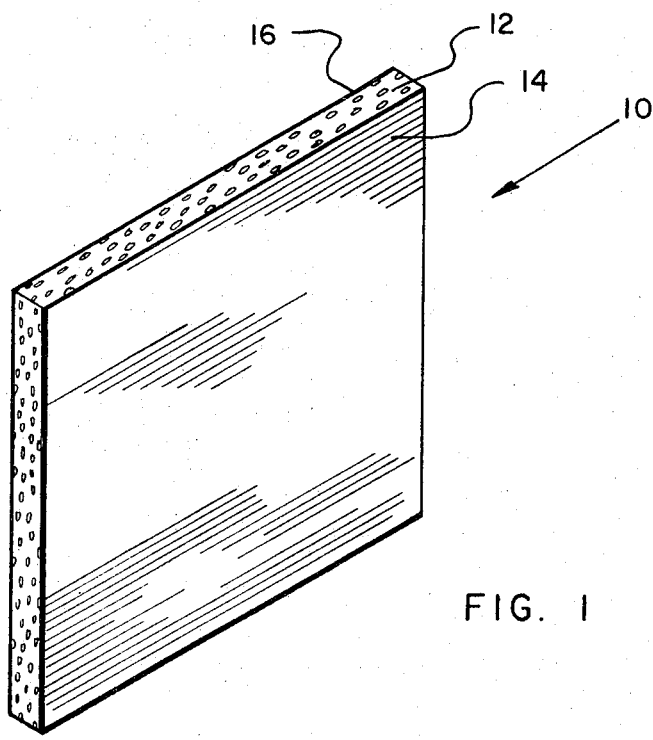
FIG. 1 is a perspective view of the polymeric foam core laminated structure of the invention as utilized for a building wall panel.

Referring now to the drawings in general and in particular to FIG. 1 of the drawing there is shown the new and novel laminated structure of the invention generally by the numeral 10 and comprises an inner polymeric foamed core 12 sandwiched between two layers of coating designated by the numeral 14 and 16. The outermost surface of the coating 14 is dissimilar from the outermost surface of the coating 16 as will be described more fully hereinafter for the purposes of allowing the laminated structure to be easily stacked on top of a similarly laminated structure without destroying the integrity of the coating caused by the coating adhering to the adjacent coating.

Figure 2:
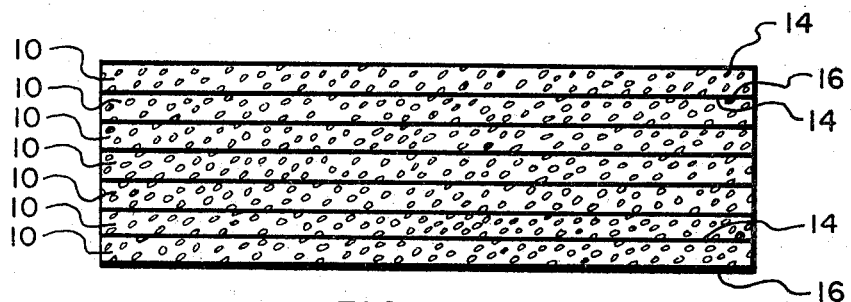
FIG. 2 is a side view of a plurality of the panels shown in FIG. 1 showing them positioned on top of each other with the relative positions of the dissimilar outer coatings also being shown.

Turning now to FIG. 2 of the drawing there is shown a plurality of laminated structures 10 stacked on top of each other in the manner in which they would be stored as they are received from the manufacturing process or as they would be stored in the warehouse of the purchaser of the panel prior to being shipped to the ultimate user. When the panels are used for example in the home building industry, it would be preferable to construct the panels with at least one of the outermost sides being pigmented in various colors for appearances with the other side generally being constructed with a clear or non-pigmented coating. Accordingly if the panel were constructed in this manner and for the purposes of illustration only, the non-pigmented coating would be applied to the side designated by the coating 16 with the pigmented coating being applied to the side designated by the coating 14. In this manner when the panels are stacked the non-pigmented coating would be laid face down on the stacking table with the pigmented side facing upwardly. The next panel would be constructed in a similar manner and would be stacked on top of the previous panel in the manner shown in FIG. 2 of the drawing. By the use of the dissimilar coatings 14 and 16 it has been found that the panels may be stacked in this manner without the respective panels adhering to each other and destroying the integrity of the coatings, especially the pigmented outer coating.

Figure 3:
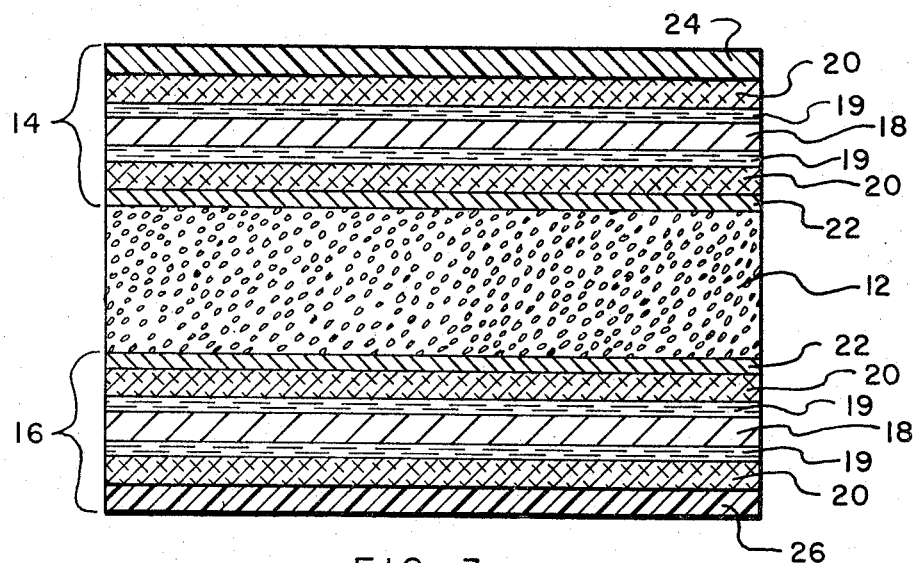
FIG. 3 is a sectional view taken through the panel shown in FIG. 1 showing the relative positions of the coatings in respect to the polymeric foam core.

Turning now to FIG. 3 of the drawing there is shown the relative positions of the coatings on the foamed polymeric core 12. As beforementioned the coatings 14 and 16 are basically constructed in a similar manner with the exception of the outermost coating 24 and 26. A kraft paper 18 is coated on both sides thereof with an alumnium foil 20 which is adhered to the kraft paper by means of a latex-casein adhesive 19 or other suitable adhesives such as polyvinyl acetate, styrene-butadiene or acrylic latex. The outermost side of one coating of aluminum foil 20 is coated with a vinyl chloride/vinyl acetate coating 24 which may be pigmented or may be non-pigmented within the spirit and scope of the invention.

In referring to a coating 24, applicant is referring to a proprietary coating of the type manufactured and/or sold by Mobil Chemical Co., Pittsburgh, Pa. under the present designation S-1299-101 and which was formerly sold under the designation S-9445-101 and is referred to by the manufacturer as a thermosetting vinyl foil lacquer. It is believed that a similar type of coating is manufactured and/or sold by the Southeast Ink and Lacquer Company in Atlanta, Georgia under the designated number MU-121.

While both of the above-mentioned coatings are believed to be thermosetting vinyl acetate/vinyl chloride copolymers it is within the spirit and scope of the invention that they could also be a physical mixture of polyvinyl chloride and polyvinyl acetate as well as a mixture of the vinyl chloride and vinyl acetate compounds.

This combination is then applied to and adhered to the polymeric foam core 12 by means of an adhesive coating 22 which may be formed from a shellac or a polyvinylidene chloride or other similar types adhesive coatings which are sufficient to promote adhesion to the polymeric core 12. This coating combination, generally designated as the numeral 14 in FIG. 3, completes the one side of the foamed core laminate with the other side being constructed similarly with the exception of the outer coating 26. As beforementioned in order to prevent the panels from adhering to each other when they are stacked, it is desirable to provide the outermost coating 26 of a dissimilar coating material than the outermost coating 24. In the preferred embodiment shown the outermost coating 26 may be formed of a nitrocellulose clear coating or may be formed of a nitrocellulose pigmented coating if it is desirable to have this side pigmented also.

When the foamed core laminate is constructed in the manner beforedescribed with the aluminum foil 20 being approximately 0.0003 inches thick and with the outermost coating 24 being applied at the rate of approximately 1.5 dry pounds per thousand square feet, the structure will have improved fire resistance when the dissimilar outermost coating 26 is applied at the rate of approximately 0.5 dry pounds per thousand square feet. The laminate thusly constructed produces a flat composite structure which has no curled or wavy edges and will produce no blisters in the aluminum foil when the structure is subjected to approximately 225°F. for a period of 5 minutes. These temperatures and times are encountered in the process of foaming the foam core 12 of the laminate structure 10.

The structure thusly produced has improved scuff resisting qualities as well as improved blocking qualities which allow the panels to be slid on top of each other and stacked on top of each other with dissimilar coatings together in a manner heretofore unknown in the prior art. The unique coating combination described herein may be applied to any of the polymeric foam cores including polyurethane, polypropylene, and polystyrene within the spirit and scope of the invention.

In practicing the method of the subject invention, the paper substrates 18 are first laminated on both sides thereof by a layer of metallic foil 20 with an adhesive 19.

A roll of this laminated structure is then coated on one side thereof with the vinyl chloride/vinyl acetate coating before described while another roll of the laminated structure is coated with the nitrocellulose coating before described.

Thereafter the two rolls of dissimilarly coated laminated structures are used to form a composite polymeric foamed core structure by laminating the vinyl chloride/vinyl acetate coated paper laminate to one side of the foamed core with an adhesive and laminating the nitrocellulose coated paper laminate to the other side of the foamed core with both coating sides being exposed on their respective sides of the structure.

When similarly coated and formed structures are stacked on top of each other in a manner so that the dissimilar outer coatings are in juxtaposition the respective coatings will not adhere to each other when they are stacked to the heights normally required for shipment in bundles. That is the vinyl chloride/vinyl acetate coating of one panel should always be stacked in juxtaposition to the nitrocellulose coating of another similar structure.

From the foregoing it should become apparent that all of the objects and advantages of the invention have been provided for by the new and novel foamed laminated structure and method disclosed herein and while many modifications may be made in the structure and arrangement of the coatings, the invention is not to be limited to the preferred embodiment which has been given by way of illustration only.

Having described the invention, we claim:

1. A fire resistant, non-blocking low density laminated structure comprising a polymeric foam core sandwiched between two layers of coated paper, each paper layer comprising an inner layer of metallic foil adhesively fixed to one side of the paper and an outer layer of metallic foil adhesively fixed to the other side of the paper and with the innermost layers of metallic foil being primed with an adhesive coating to promote adhesion to the polymeric core, the outermost side of one outer metallic foil being primed with a coating dissimilar from the outermost side of the other outer metallic foil, one of the outermost coatings comprising a vinyl chloride/vinyl acetate coating and the other of the outermost coatings comprising a nitrocellulose coating, the dissimilar outermost coatings functioning to allow similar laminated structures to be stacked on top of each other so that the dissimilar coatings are in juxtaposition thereby preventing the structures from adhering to each other.

2. The laminated structure as defined in claim 1 wherein the vinyl chloride/vinyl acetate coating is pigmented.

3. The laminated structure as defined in claim 1 wherein the nitrocellulose coating is pigmented.

4. The laminated structure as defined in claim 1 wherein the one outermost coating comprises a vinyl chloride/vinyl acetate copolymer coating.

5. The laminated structure as defined in claim 1 wherein the one outermost coating comprises a physical mixture of polyvinyl chloride and polyvinyl acetate.

6. The laminated structure as defined in claim 1 wherein the one outermost coating comprises a mixture of the vinyl chloride and vinyl acetate compounds.

7. A method of providing a non-blocking low density laminated structure, comprising the steps of:
   a. laminating a plurality of paper substrates on both sides to a layer of metallic foil with an adhesive;
   b. coating a portion of the laminated paper substrates on at least one side with a vinyl chloride/vinyl acetate coating;
   c. coating another portion of the laminated paper substrates on at least one side with a nitrocellulose coating; and
   d. forming a composite structure by laminating the vinyl chloride/vinyl acetate coated paper to one side of a polymeric foamed core and laminating the nitrocellulose coated paper to the other side of the foamed core, with both the vinyl chloride/vinyl acetate coating and the nitrocellulose coating being exposed on their respective sides of the structure.

8. The method as defined in claim 7 further comprising the step of:
   e. stacking the composite structures on top of each other so that the vinyl chloride/vinyl acetate coating is in juxtaposition with the nitrocellulose coating.

9. The method as defined in claim 8 wherein the vinyl chloride/vinyl acetate coating is a thermosetting vinyl chloride/vinyl acetate copolymer.

10. The method as defined in claim 8 wherein the vinyl chloride/vinyl acetate coating is a physical mixture of polyvinyl chloride and polyvinyl acetate.

11. The method as defined in claim 8 wherein the vinyl chloride/vinyl acetate coating is a mixture of the vinyl chloride and vinyl acetate compounds.

* * * * *